US008825844B2

(12) United States Patent
Bajamahal

(10) Patent No.: US 8,825,844 B2
(45) Date of Patent: Sep. 2, 2014

(54) NOTIFYING NETWORK OPERATOR WHEN VIRTUAL ADDRESSES DO NOT MATCH ON NETWORK ELEMENTS CONFIGURED FOR INTERCHASSIS REDUNDANCY

(75) Inventor: Nageshwar Bajamahal, Santa Clara, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 339 days.

(21) Appl. No.: 13/221,743

(22) Filed: Aug. 30, 2011

(65) Prior Publication Data

US 2013/0054789 A1    Feb. 28, 2013

(51) Int. Cl.
| G06F 15/173 | (2006.01) |
| H04L 12/24 | (2006.01) |
| H04L 29/12 | (2006.01) |
| H04L 12/56 | (2006.01) |

(52) U.S. Cl.
CPC ......... *H04L 41/0873* (2013.01); *H04L 61/2046* (2013.01); *H04L 41/06* (2013.01); *H04L 41/0672* (2013.01); *H04L 61/2007* (2013.01); *H04L 45/586* (2013.01)
USPC ............................ 709/224; 709/223; 709/225

(58) Field of Classification Search
CPC . H04L 41/0873; H04L 41/06; H04L 41/0672; H04L 61/2046; H04L 61/2007; H04L 45/586
See application file for complete search history.

(56) References Cited

U.S. PATENT DOCUMENTS

| 8,510,265 B1 * | 8/2013 | Boone et al. ............... 709/221 |
| 2006/0250197 A1 | 11/2006 | Petrovic |
| 2007/0253328 A1 | 11/2007 | Harper et al. |
| 2008/0144634 A1 * | 6/2008 | Chamarajanagar et al. .. 370/397 |
| 2010/0220656 A1 * | 9/2010 | Ramankutty et al. ......... 370/328 |

OTHER PUBLICATIONS

Interchassis High Availability, Cisco Unified Border Element (SP Edition) Configuration Guide: Unified Model, pp. 337-352 http://www.cisco.com/en/US/docs/ios/sbc/command/references/sbcu_book.html.

* cited by examiner

*Primary Examiner* — Patrice Winder
*Assistant Examiner* — Nam Tran
(74) *Attorney, Agent, or Firm* — Blakely Sokoloff Taylor Zafman LLP

(57) ABSTRACT

A method, in a first network element, of notifying a network operator when mismatching sets of virtual addresses are configured on first and second network elements, prior to making one of the sets of virtual addresses available for network traffic reception. The first network element is coupled with a second network element by a synchronization channel. The network elements are configured to exchange synchronization data over the synchronization channel. A second set of virtual addresses, which are configured on the second network element, are received from the second network element. It is determined that the second set of virtual addresses and a first set of virtual addresses, which are configured on the first network element, do not match. A network operator is notified responsive to determining that first and second sets of virtual addresses do not match. The method may prevent problems that occur when the virtual addresses don't match.

24 Claims, 9 Drawing Sheets

FIG. 3

METHOD IN FIRST NETWORK ELEMENT
OF NOTIFYING NETWORK OPERATOR
OF MISMATCHING VIRTUAL ADDRESSES
320

RECEIVE, FROM SECOND NETWORK ELEMENT, A SECOND SET OF VIRTUAL ADDRESSES, WHICH ARE CONFIGURED ON SECOND NETWORK ELEMENT — 321

DETERMINE THAT SECOND SET OF VIRTUAL ADDRESSES AND A FIRST SET OF VIRTUAL ADDRESSES, WHICH ARE CONFIGURED ON FIRST NETWORK ELEMENT, DO NOT MATCH — 322

NOTIFY NETWORK OPERATOR RESPONSIVE TO DETERMINING THAT FIRST AND SECOND SETS OF VIRTUAL ADDRESSES DO NOT MATCH — 323

NOTIFYING NETWORK OPERATOR WHEN VIRTUAL ADDRESSES DO NOT MATCH ON NETWORK ELEMENTS CONFIGURED FOR INTERCHASSIS REDUNDANCY

FIELD

Embodiments of the invention relate to the field of networking; and more specifically, to notifying a network operator when virtual addresses do not match on network elements configured for interchassis redundancy.

BACKGROUND

In communication networks it is generally desirable to prevent service outages and/or loss of network traffic. By way of example, such service outages and/or loss of network traffic may occur when a network element fails, loses power, is taken offline, is rebooted, a communication link to the network element breaks, etc.

In order to help prevent such service outages and/or loss of network traffic, the communication networks may utilize interchassis redundancy (ICR). FIG. 1 is a block diagram of a prior art example of an interchassis redundancy (ICR) system 100. The ICR system includes a first network element 101-1 and a second network element 101-2. In the illustrated example, the first network element is an active network element, and the second network element is a standby network element. The first and second network elements each have a different physical chassis.

The first, active network element has a better Border Gateway Protocol (BGP) metric 104-1, which is better than a worse BGP metric 104-2 of the second, standby network element. The relative values of the better and worse BGP metrics are operable to cause network traffic exchanged with a plurality of other network elements 108 to be directed to the first, active network element, instead of to the second, standby network element. The network traffic is communicated over a plurality of network interfaces 107.

The first, active network element is operable to handle the network traffic and creates, maintains, and utilizes corresponding network traffic data 106-1 (e.g., session data). The first network element has a first ICR component 103-1, and the second network element has a second ICR component 103-2. The first and second network elements are coupled, or otherwise in communication, by a synchronization channel 102. The first and second ICR components are operable to cause the first and second network elements to exchange synchronization data 109 over the synchronization channel. The network traffic data 106-1 maintained by the first, active network element may be sent to the second, standby network element and preserved as replicated or redundant network traffic data 106-2. The synchronization data may represent a synchronization of stateful session data.

The first and second ICR components 103-1, 103-2 may also detect switchover events. By way of example, the ICR components may exchange messages over the synchronization channel in order to monitor the status of the other network element and control switchovers in response to switchover events. Examples of switchover events include, but are not limited to, the active network element or a critical portion thereof failing, the active network element or a critical portion thereof being taken offline (e.g., by a network operator in order to perform maintenance or an upgrade), the active network element rebooting, breaks in a communication link leading to the active network element, loss of power to the active network element, network operator induced switchovers (e.g., through a command-line interface (CLI) command), etc.

When a switchover event is detected, the ICR components 103-1, 103-2 may cause the current second, standby network element 101-2 to transition to the new active network element, and the current first, active network element 101-1 (when it is able to do so) to transition to the new standby network element. This may involve the ICR components toggling the relative magnitudes of the BGP metrics 104-1, 104-2. The new active network element may then virtually seamlessly begin handling the network traffic, for example by recreating subscriber sessions that were terminated on the former active network element, and utilizing the redundant set of network traffic data 106-2. When it is able, the new standby network element (in this case the first network element 101-1) may be synchronized to maintain a redundant set of the current network traffic data.

In some cases, the ICR system may be used to provide geographical redundancy of network traffic data. The first network element 101-1 may reside at a first geographical location 110-1 and the second network element 101-2 may reside at a second, different geographical location 110-2. The first and second different geographical locations may be remotely located from one another (e.g., locations at least several miles apart, different towns or cities, different states, different countries, etc.). Using ICR with geographical redundancy may help to reduce service outages and/or loss of network traffic in the event of a geographically localized disruption of service (e.g., due to catastrophic weather or another catastrophic event occurring at one geographical location). In the event of such a geographically localized disruption of service, network traffic handling may be switched to the other network element at the other geographical location, which generally should not be affected by the same geographically localized disruption of service.

Referring again to FIG. 1, a first set of virtual addresses 105-1, which is configured on the first, active network element, is used to access the network interfaces 107. A corresponding second set of virtual addresses 105-2 is configured on the second, standby network element. Traditionally, one or more network operator(s) manually configure the first and second sets of virtual addresses on the first and second network elements of an ICR system.

SUMMARY

In one aspect, a method in a first network element, of notifying a network operator when mismatching sets of virtual addresses are configured on first and second network elements, prior to making one of the sets of virtual addresses available for network traffic reception. The first network element is coupled with the second network element by a synchronization channel. The network elements are configured to exchange synchronization data over the synchronization channel. The method includes a step of receiving, from the second network element, a second set of virtual addresses, which are configured on the second network element. The method includes a step of determining that the second set of virtual addresses and a first set of virtual addresses, which are configured on the first network element, do not match. The method also includes a step of notifying a network operator responsive to determining that the first and second sets of virtual addresses do not match. Advantageously, as a result, problems that may occur when network traffic reception occurs while mismatching sets of virtual addresses are configured on the network elements, such as active-active states and role flip-flopping, may be avoided.

In another aspect, a first network element that is operable to notify a network operator when mismatching sets of virtual addresses are configured on the first and second network elements, presses, prior to making one of the sets of virtual addresses available for network traffic reception. The first network element is operable to be coupled with a second network element by a synchronization channel. The first network element is configured to exchange synchronization data with the second network element over the synchronization channel. The first network element includes a plurality of network interfaces. The first network element also includes a virtual address reception component, which is coupled with the network interfaces. The virtual address reception component is operable to receive, from the second network element, a second set of virtual addresses, which are configured on the second network element. The first network element further includes a virtual address comparison component that is coupled with the virtual address reception component. The virtual address comparison component is operable to compare the second set of virtual addresses with a first set of virtual addresses, which are configured on the first network element. The first network element includes a notification component, which is coupled with the virtual address comparison component. The notification component is operable to cause a notification of a network operator in an event that the comparison indicates that the first and second sets of virtual addresses do not match.

The first network element further includes a traffic direction component that is coupled with the network interfaces. The traffic direction component has a traffic direction attribute and is operable to announce the first set of virtual addresses with the traffic direction attribute. The first network element also includes an interchassis redundancy component, which is coupled with the virtual address comparison component, the traffic direction component, and the network interfaces. The interchassis redundancy component is operable to cause the traffic direction component to announce the first set of virtual addresses with the traffic direction attribute in an event that the comparison indicates that the first and second sets of virtual addresses match. Advantageously, the network element may be operable to avoid problems that may occur when network traffic reception occurs while mismatching sets of virtual addresses are configured on the network elements, such as active-active states and role flip-flopping.

BRIEF DESCRIPTION OF THE DRAWINGS

The invention may best be understood by referring to the following description and accompanying drawings that are used to illustrate embodiments of the invention. In the drawings:

FIG. 3 is a block flow diagram of an example embodiment of a method, performed in a first network element, of notifying a network operator when mismatching sets of virtual addresses are configured on the first network element and a second network element, prior to making one of the sets of virtual addresses available for network traffic reception.

DESCRIPTION OF EMBODIMENTS

In the following description, numerous specific details are set forth, such as, for example, particular redundancy systems, particular network elements, particular notifications, particular sequences of operations, etc. However, it is understood that embodiments of the invention may be practiced without these specific details. In other instances, well-known circuits, structures and techniques have not been shown in detail in order not to obscure the understanding of this description.

The sets of virtual addresses configured on network elements of an interchassis redundancy (ICR) system should match in order for the ICR system to function properly. When manually configuring sets of virtual addresses on the network elements of the ICR system so that they match, there is always a chance that, due to network operator(s) error, the first and second sets of virtual addresses may not match. For example, the network operator(s) may fail to configure a particular virtual address on one of the network elements and/or may make a mistake in configuring a particular virtual address on one of the network elements. The chance of the first and second sets of virtual addresses not matching tends to be even greater in a geographically distributed ICR system. For example, in some cases, different network operators at different geographical locations may be responsible for configuring the different sets of virtual addresses for the network elements of the ICR system. In such cases, miscommunication, misunderstanding, lack of coordination, or the like, may tend to increase the chances of configuring mismatching sets of virtual addresses on the network elements participating in ICR.

Mismatching sets of virtual addresses may cause the ICR system to function incorrectly. The virtual addresses may be used to control the network elements or network interfaces that receive traffic. A network address (e.g., an Internet Protocol (IP) address) may represent a numerical label assigned to a network element or network interface that may be used for network element or network interface identification and addressing. The virtual addresses (e.g., virtual IP addresses) may not be assigned to specific network elements or network interfaces. Incoming data (e.g., packets) may be sent to a virtual address, but may be redirected to a specific network element and/or network interface. A network interface on one network element may be paired with another network interface on another network element. The interface that is associated with the active network element may exclusively own the virtual address. When a switchover occurs, the ownership of the virtual address may change from the active network element to the standby network element.

Figure 1:
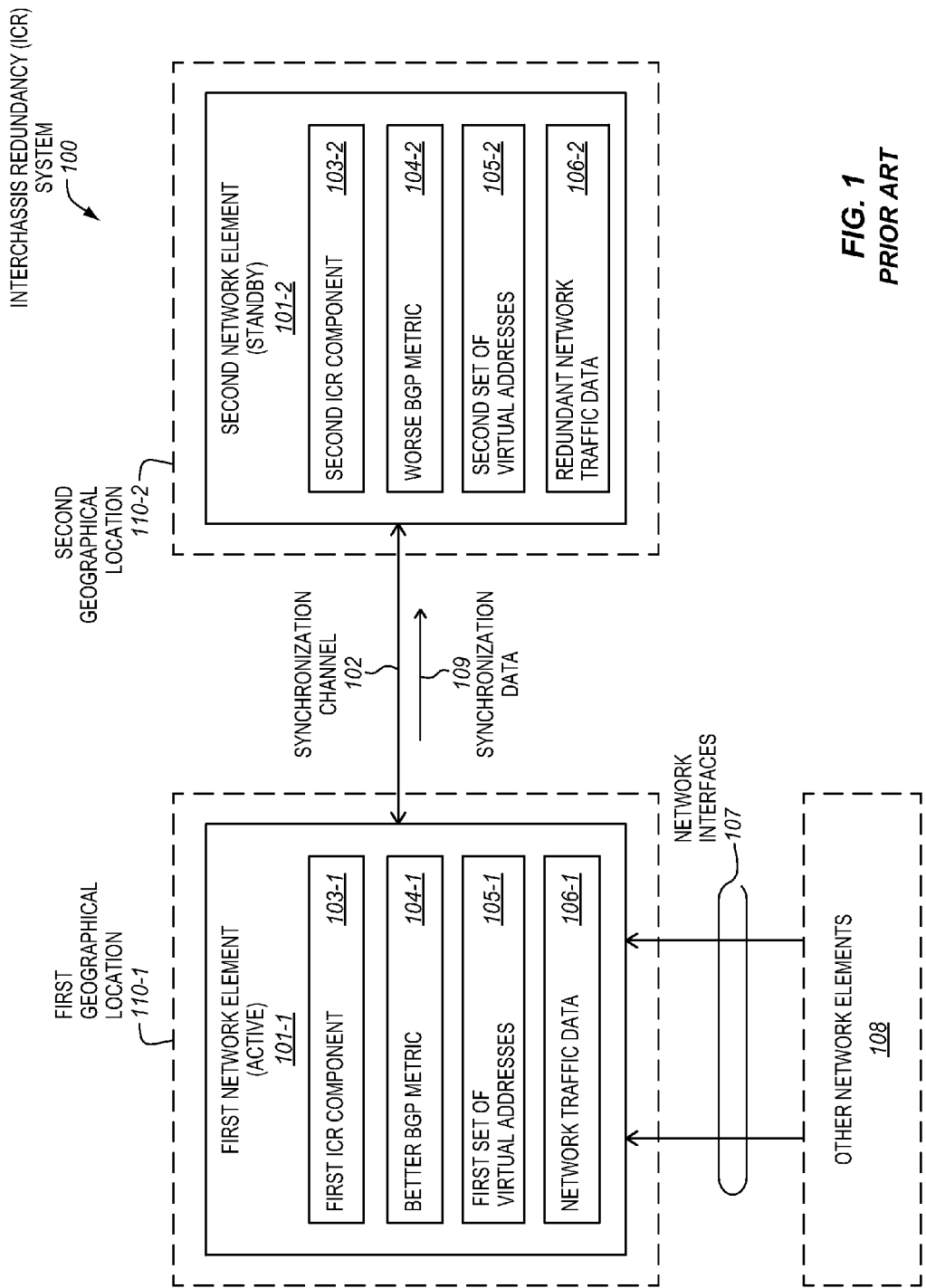
FIG. 1 is a block diagram of a prior art example of an interchassis redundancy (ICR) system.
Figure 2:
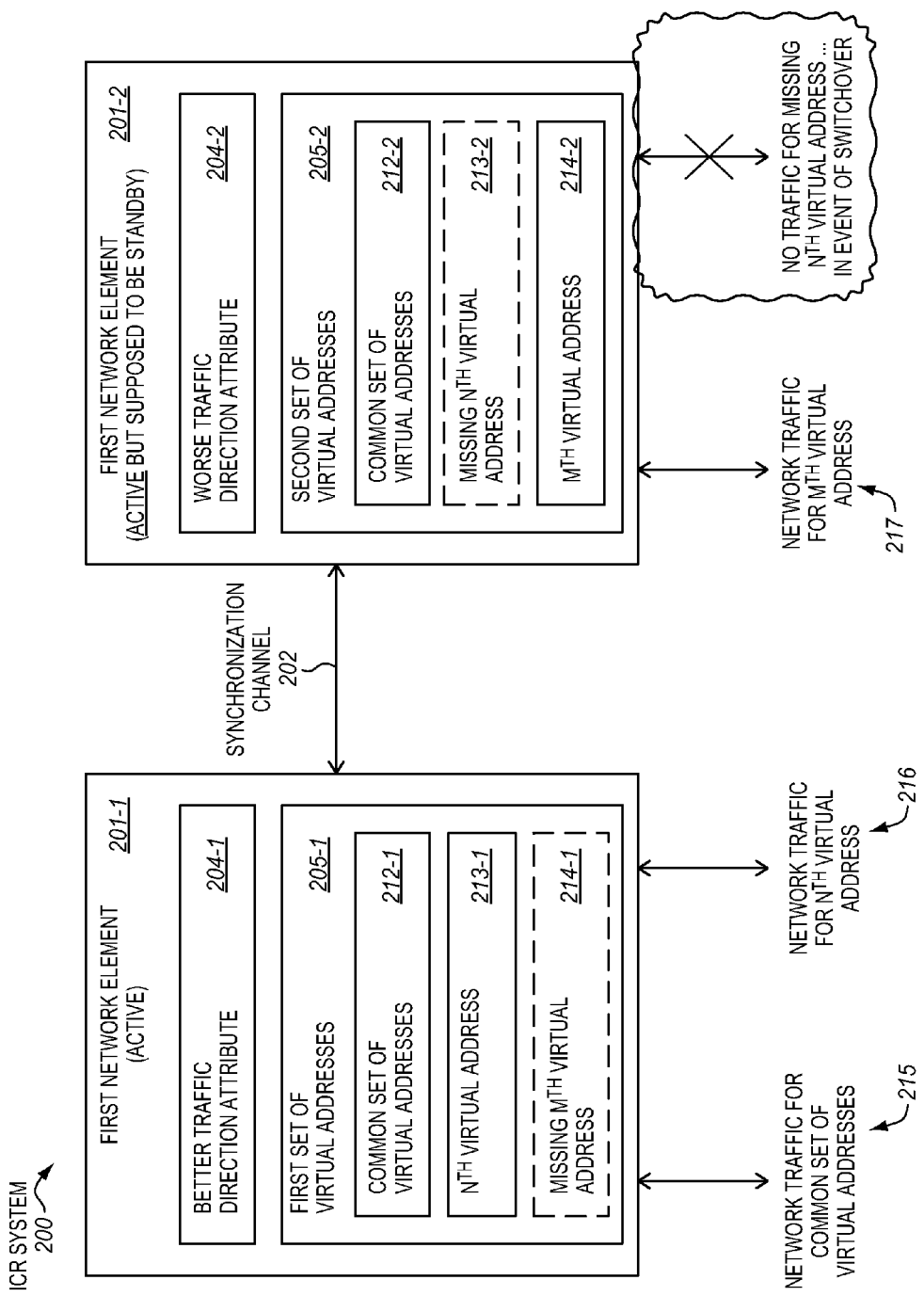
FIG. 2 is a block diagram of an ICR system that illustrates various problems that may occur when mismatching sets of virtual addresses are configured on the network elements of the ICR system.

Various problems may result when network traffic is processed on an ICR system when the virtual addresses configured on the network elements do not match. FIG. 2 is a block diagram of an ICR system 200 that illustrates various problems that may occur when mismatching sets of virtual addresses 205-1, 205-2 are configured on the network elements 201-1, 201-2 of the ICR system. The ICR system includes a first network element 201-1 and a second network element 201-2 that are coupled or in communication by a synchronization channel 202.

The first network element has a better traffic direction attribute 204-1, which is better than a worse traffic direction attribute 204-2 of the second network element. By way of example, these traffic direction attribute may include BGP metrics, Open Shortest Path First (OSPF) metrics, other routing protocol metrics, or L2 traffic direction attributes. Based on the relative values of the better and worse traffic direction attributes, the first network element should be active and the second network element should be standby. However, as shown, both the first and second network elements are active.

This active-active state due to mismatching first and second sets of virtual addresses 205-1, 205-2 configured on the first and second network elements, respectively. As shown in the example, the first and second sets of virtual addresses may each have a common set of one or more matching virtual addresses 212-1, 212-2. However, the first set of virtual addresses may also have an Nth virtual address 213-1, whereas the second set of virtual addresses may have a missing Nth virtual address 213-2. Also, the second set of virtual addresses may have an Mth virtual address 214-2, whereas the first set of virtual addresses may have a missing Mth virtual address 214-1. Missing may mean that the address is absent or that the address is erroneously configured such that it would not match a correctly configured address.

Both network elements may announce or advertise their respective common set of virtual addresses 212-1, 212-2, with their respective traffic direction attributes 204-1, 204-2. Since the first network element has the better traffic direction attribute 204-1, the corresponding network traffic 215 for the common set of virtual addresses 212-1, 212-2 may go to the first network element 201-1. The first network element may also announce or advertise the Nth virtual address 213-1, with the better traffic direction attribute 204-1, and network traffic 216 for the Nth virtual address 213-1 may go to the first network element 201-1. However, in the event of a switchover, due to the missing Nth virtual address 213-2 on the second network element 201-2, the second network element 201-2 may not be configured to receive traffic for the missing Nth virtual address 213-2.

Due to the missing Mth virtual address 214-1 on the first network element 201-1, the first network element may not announce or advertise the missing Mth virtual address 214-1. The second network element 201-2 may announce the Mth virtual address 214-2 with the worse traffic direction attribute 204-2, and nevertheless network traffic 217 for the Mth virtual address 214-2 may go to the second network element 201-2, which is supposed to be standby. As a result, the second network element may be active for part of the network traffic associated with the Mth virtual address 214-2. The network elements 201-1, 201-2 may both be in an active-active state, which is not the intended active-standby state.

This active-active state may also potentially cause the network elements to flip-flop between active and standby roles. For example, the network elements may each detect that the other is active, for example by exchanging status messages over the synchronization channel. The network elements may try to resolve this active-active state. By way of example, both network elements may transition to a standby state, and both may again announce the virtual addresses that are configured on that network element. However, due to the still missing Mth virtual address 214-1, the network elements may again end up in the aforementioned active-active state. This process may be repeated, and the network elements may essentially flip-flop between active and standby states. This is inefficient and undesirable.

A method, network element, and ICR system, are disclosed to detect mismatching sets of virtual addresses on network elements configured for interchassis redundancy, and to notify a network operator.

FIG. 3 is a block flow diagram of an example embodiment of a method 320, performed in a first network element, of notifying a network operator when mismatching sets of virtual addresses are configured on the first network element and a second network element, prior to making one of the sets of virtual addresses available for network traffic reception. The first network element is coupled or in communication with the second network element by a synchronization channel. The network elements are configured to exchange synchronization data over the synchronization channel. One of the network elements is to be designated as active and the other network element is to be designated as standby. The first network may be either the active or standby network element.

The method includes receiving, from the second network element, a second set of virtual addresses, which are configured on the second network element, at block 321. In some embodiments, the second set of virtual addresses may be received from the synchronization channel. For example, the second network element may send a message to the first network element that includes the second set of virtual addresses. In some aspects, the virtual addresses may be virtual Internet Protocol (IP) network addresses.

Then, a determination is made that the second set of virtual addresses and a first set of virtual addresses, which are configured on the first network element, do not match, at block 322. Such a determination may include comparing the virtual addresses in the first set with the virtual addresses in the second set. The addresses may either be compared for equality or lack of equality. In one aspect, such a determination may include identifying at least one virtual address in one set that is not equal to any of the virtual addresses in the other set. In another aspect, such a determination may include failing to determine that each of the virtual addresses in one set is equal to one and only one virtual address in the other set, and vice versa.

To further illustrate, the first and second sets of virtual addresses may be determined not to match when: (a) the first set has the virtual addresses VA1, VA2, VA3, VA4, and VA5, while the second set has the virtual addresses VA1, VA2, VA3, and VA5 (i.e., notice that VA4 is missing); (b) the first set has the virtual addresses VA1, VA2, VA4, and VA5 (i.e., notice that VA3 is missing), while the second set has the virtual addresses VA1, VA2, VA3, VA4, and VA5; or (c) the first set has the virtual addresses VA1, VA2, VA3, VA4, and VA5, while the second set has the virtual addresses VA1, VA2, VA3, VA4, VA5, and VA6 (i.e., notice that VA6 is included). In some embodiments, rather than comparing the entire virtual addresses, prefixes or other portions of the virtual addresses may be compared. As used herein, determining that a first virtual address and a second virtual address do not match encompasses determining that a portion (e.g., a first prefix) of the first virtual address does not match a corresponding portion (e.g., a second prefix) of the second virtual address.

In some embodiments, the determination at block 322 may include not only comparing the virtual addresses, but also comparing one or more attributes associated with the corresponding virtual addresses. For example, a first attribute pertaining to a first virtual address of the first set of virtual addresses may be compared with a corresponding second attribute pertaining to a second corresponding virtual address of the second set of virtual addresses. One example of suitable attributes is route map rules, statements, criteria, or other attributes. Route-map rules are commonly used in networking. The route map rules may include an ordered sequence of individual statements each having a permit or deny result. Each statement may have criteria to be evaluated for a match and an associated action to be performed in the event of evaluation of the criteria matching. For example, in some embodiments, the comparison may further include comparing a first set of one or more route map rule(s) corresponding to the first set of IP addresses of the first network element with a second set of one or more route map rule(s) corresponding to the second set of IP address on the second network element. Another example of suitable attributes is access control list information or attributes. Other attributes are also contemplated.

Then, a network operator is notified responsive to determining that the first and second sets of virtual addresses do not match, at block 323. In various embodiments, notifying the network operator may include sending a message to the network operator, providing an alarm, adding an error to an error log, or a combination thereof. In some embodiments, the network operator, in addition to being notified, may be notified specifically that the first and second sets of virtual addresses do not match. For example, a message or text may be sent to the network operator stating that the virtual addresses do not match. In some aspects, a particular address that does not match (e.g., a virtual address that is configured on only one of the first and second network elements but not both) may be specifically indicated as not matching.

Advantageously, notifying the network operator that the first and second sets of virtual addresses do not match may allow the network operator to change one or more of the sets of virtual addresses so that they match, prior to making one of the sets of virtual addresses available for network traffic reception. This may help to avoid the aforementioned problems that may occur when mismatching sets of virtual addresses are configured on network elements participating in ICR. For example, this may help to avoid active-active states and/or ICR role flip flops. As another example, this may help to avoid a situation where a particular virtual address on the active network element is not properly backed up on the standby network element (e.g., missing Nth virtual address 213-1 in FIG. 2), which may lead to service outages and/or loss of network traffic following a switchover event. Moreover, the method described also has other uses, such as, for example, to reduce network operator workload by reducing the number comparisons that need to be performed manually and/or to increase the chances of catching a mismatching configuration.

In some embodiments, each of the network elements participating in ICR may perform the above-described method. For example, the first network element, in addition to receiving the second set of virtual addresses, may also send the first set of virtual addresses to the second network element, and the second network element may also compare the sets of virtual addresses and notify the network operator in an event that they do not match. Alternatively, only one of the network elements may perform such a method.

Figure 4:
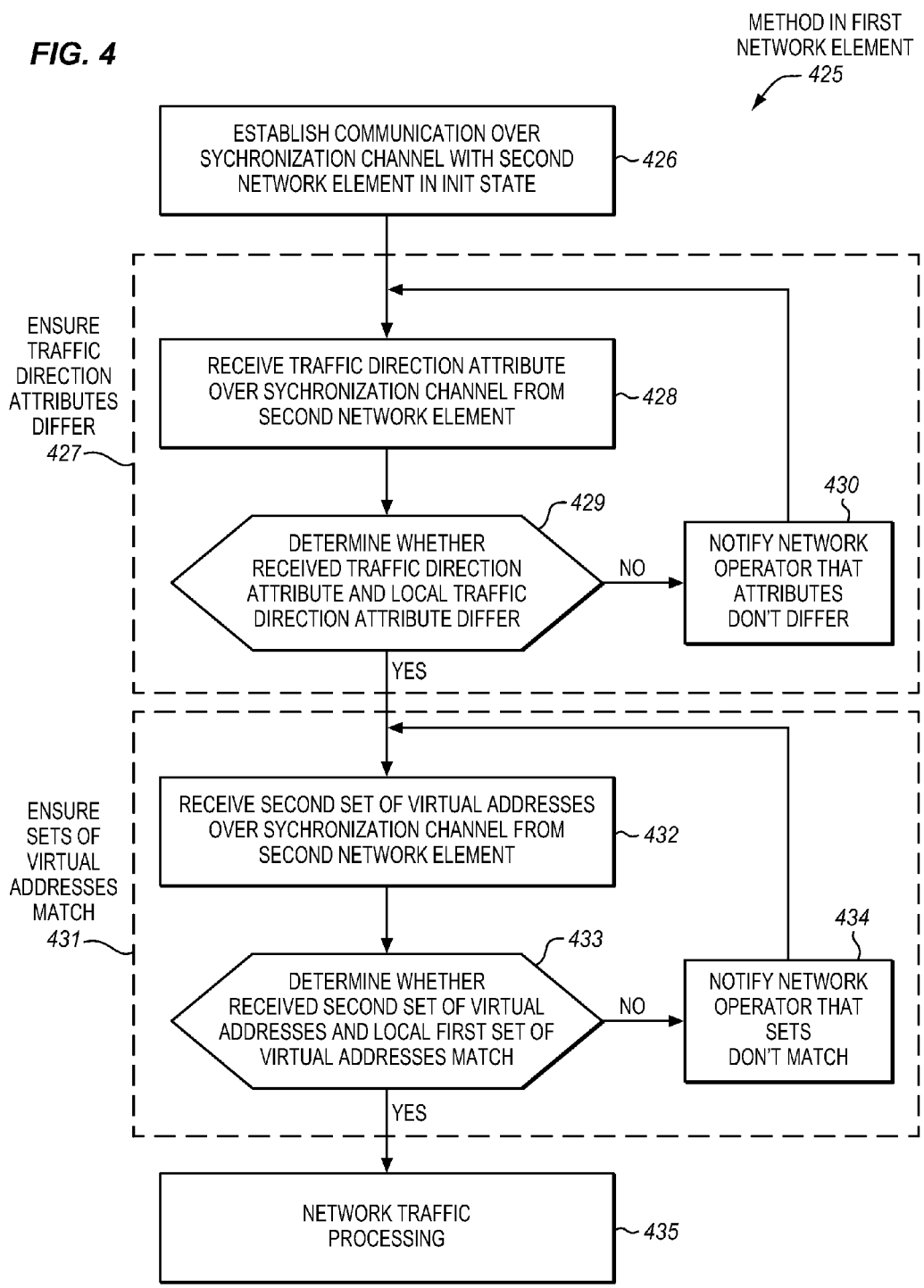
FIG. 4 is a block flow diagram of an example embodiment of a method, performed in a first network element, of ensuring that traffic direction attributes of the first network element and a second network element differ, and ensuring that sets of virtual addresses on the first and second network elements match, prior to network traffic processing.

FIG. 4 is a block flow diagram of an example embodiment of a method 425, performed in a first network element, of ensuring that traffic direction attributes of the first network element and a second network element differ, and ensuring that sets of virtual addresses on the first and second network elements match, prior to network traffic processing. The first network element is coupled with the second network element by a synchronization channel. The network elements are configured for ICR and to exchange synchronization data over the synchronization channel. One of the network elements is to be designated as active and the other network element is to be designated as standby. The first network may either be designated as the active or standby network element.

The method includes establishing communication with the second network element over the synchronization channel, while the first and second network elements are in an initialization (init) state, at block 426. In one aspect, the synchronization channel may represent a dedicated peer-to-peer channel that may be implemented over the same network that is used to handle the network traffic. Examples of suitable transport protocols include, but are not limited to, various different types of TCPs (Transmission Control Protocols), various different types of UDPs (User Datagram Protocols), and combinations thereof.

The method ensures that the traffic direction attributes of the first network element and a second network element differ, at block 427. In some embodiments, it may be desirable for each of the network elements to have a different predefined default attribute. In various aspects, the traffic direction attributes may be Layer 3 traffic direction attributes (e.g., BGP metrics, OSPF metrics, or other L3 traffic direction attributes), or Layer 2 traffic direction attributes (e.g., through manipulation of a virtual MAC address for Virtual Router Redundancy Protocol (VRRP)).

The traffic direction attribute of the second network element may be received from the second network element over the synchronization channel, at block 428. A determination may be made whether the received traffic direction attribute of the second network element and a local traffic direction attribute of the first network element differ, at block 429. If the traffic direction attributes do not differ (i.e., "no" is the determination at block 429), then the method may advance to block 430, where the network operator may be notified that the traffic direction attributes do not differ. In one aspect, this may allow the network operator to change one or more of the traffic direction attributes on the first and second network elements so that they differ. The method may then return to block 428. Conversely, if the determination at block 429 is that the traffic direction attributes differ (i.e., "yes" is the determination at block 429), then the method may advance to block 431.

At block 431, the method ensures that the first and second sets of virtual addresses of the first and second network elements match. The second set of virtual addresses of the second network element is received from the second network element over the synchronization channel, at block 432. A determination is made whether the received second set of virtual addresses and a local first set of virtual addresses of the first network element match, at block 433. As before, the addresses may either be compared for equality or lack of equality. Moreover, in some embodiments, rather than comparing the entire virtual addresses, prefixes or other portions of the virtual addresses may be compared.

If the sets of virtual addresses do not match (i.e., "no" is the determination at block 433), then the method may advance to block 434, where the network operator may be notified that the sets of virtual addresses do not match. In one aspect, this may allow the network operator to change one or more of the first and second sets of virtual addresses so that they match. For example, the first network element and/or the second network element may receive a change to its respective set of configured virtual addresses, such as, for example, through a command-line interface (CLI), a Simple Network Management Protocol (SNMP) interface, or other network element management interface. The method may then return to block 432, where another, potentially updated second set of virtual addresses may be received from the second network element over the synchronization channel. Then, upon revisiting block 433, a determination may again be made whether the received potentially updated second set of virtual addresses and the potentially updated first set of virtual addresses match. If the determination at block 433 is that the sets of virtual addresses match (i.e., "yes" is the determination at block 433), then the method may advance to block 435.

At block 435, network traffic processing is performed. The particular network traffic processing depends upon whether the first network element is designated to be active or standby. In the case of the first network element being designated to be active, the network traffic processing performed by the first network element may include making the first set of virtual addresses available for network traffic reception (e.g., advertising or announcing the first set of virtual addresses to the network and transitioning from the init state to the active state), receiving network traffic through the first set of virtual addresses, and sending synchronization data to the second network element over the synchronization channel. Conversely, in the case of the first network element being designated to be standby, the network traffic processing performed by the first network element may include either advertising or announcing or not advertising or announcing the first set of virtual addresses to the network, transitioning from the init state to the standby state, and receiving synchronization data from the second network element over the synchronization channel. Notice that in the later case, the second set of virtual addresses rather than the first set of virtual addresses has been made available for network traffic reception.

Advantageously, in the illustrated embodiment of the method, network traffic processing associated with the first and second sets of virtual addresses is not performed until the traffic direction attributes of the network elements differ, and until the sets of virtual addresses configured on the network elements match. Ensuring that the traffic direction attributes differ prior to network traffic processing may help to avoid lack of clarity about which of the network elements is to be active and which is to be standby. Ensuring that the sets of virtual addresses match, prior to network traffic processing, may help to avoid an active-active state and/or ICR role flip-flopping.

While FIG. 4 shows a particular order of operations performed by certain embodiments of the invention, such order is exemplary. Alternative embodiments may perform the operations in a different order, combine certain operations, overlap certain operations, etc.

Various different ways are contemplated to notify a network operator when virtual addresses configured on network elements participating in ICR do not match. In some embodiments, the notification may be provided to the network operator without the operator needing to first query, whereas in other embodiments the notification may be provided to the network operator in response to a query from the network operator. For example, the network operator may issue a query upon detecting that the network elements are stuck in an init state or when a general-purpose alarm, error, or other notification is provided.

Figure 5A:
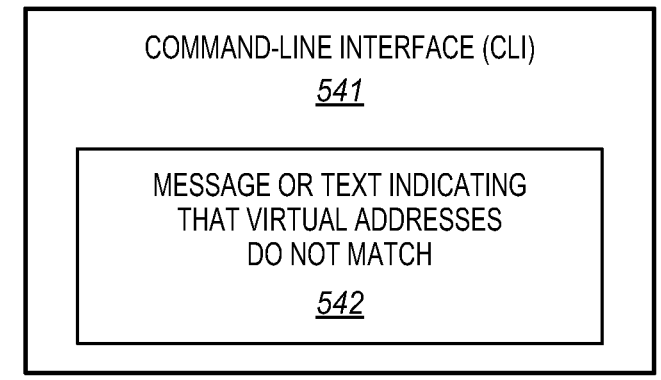
FIG. 5A is a block diagram of a first example embodiment of a notification that may be provided to a network operator when virtual addresses on network elements participating in ICR do not match.

FIG. 5A is a block diagram of a first example embodiment of a notification 540A that may be provided to a network operator when virtual addresses on network elements participating in ICR do not match. The notification 540A includes a message or text 541 on a command-line interface (CLI). The CLI is a text-only interface or mechanism that allows the network operator to interact with the network element by typing commands to perform specific tasks and by receiving information from the network element.

The message or text 542 indicates that the virtual addresses do not match. A few examples of possible messages or text include, but are not limited to, "VIRTUAL ADDRESSES DO NOT MATCH," "CONFIGURED ADDRESSES DIFFER FROM OTHER NODE," "MISMATCHING ADDRESSES CONFIGURE," "VERIFY IP ADDRESSES," "STUCK IN INIT STATE—CHECK ADDRESSES," or the like. In some cases, the message or text may optionally indicate one or more non-matching virtual address. A few examples of possible messages or text include for a particular non-matching virtual address (VAx) include, but are not limited to, "VAx CONFIGURATOIN ON ACTIVE NODE BUT NOT ON STANDBY NODE," "ICR VAx NOT CONFIGURED PROPERLY," "CHECK VIRTUAL ADDRESS VAx," or the like. In other cases, the message or text may optionally include a first list of all virtual addresses configured on the first network element and a second list of all virtual addresses configured on the second network element. In some cases, one or more non-matching virtual addresses may optionally be differentiated, for example, with text, a symbol (e.g., an asterisk), a different color, highlighting, underlining, bolding, a different font, etc. In other embodiments, rather than a CLI or text-only interface, a graphical user interface (GUI) other interface may optionally be used.

Figure 5B:
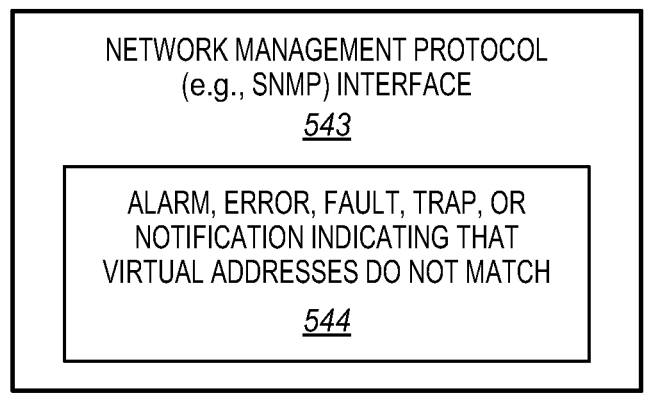
FIG. 5B is a block diagram of a second example embodiment of a notification that may be provided to a network operator when virtual addresses on network elements participating in ICR do not match.

FIG. 5B is a block diagram of a second example embodiment of a notification 540B that may be provided to a network operator when virtual addresses on network elements participating in ICR do not match. The notification 540B includes a Simple Network Management Protocol (SNMP) alarm, SNMP error, SNMP fault, SNMP trap, or like SNMP notification 544 on an SNMP interface 543. SNMP represents a protocol for managing network elements on Internet Protocol networks that is commonly used to monitor the network elements for conditions that warrant administrative attention. The SNMP notification 544 may indicate that the virtual addresses do not match. The aforementioned types of message and text are suitable, as are other graphics, colors, shapes, symbols, sounds, lights, and combinations thereof.

In still other embodiments, a notification may include similar messages, text, symbols, etc. written or provided to an error log. The network operator may need to access the messages, text, or symbols, rather than them being sent proactively to the network operator. The network operator may be notified to access the error log by the network elements being stuck in init state, by a general-purpose or multi-purpose error signal (e.g., a light, audible alarm, non-specific text or message, etc.).

Figure 6:
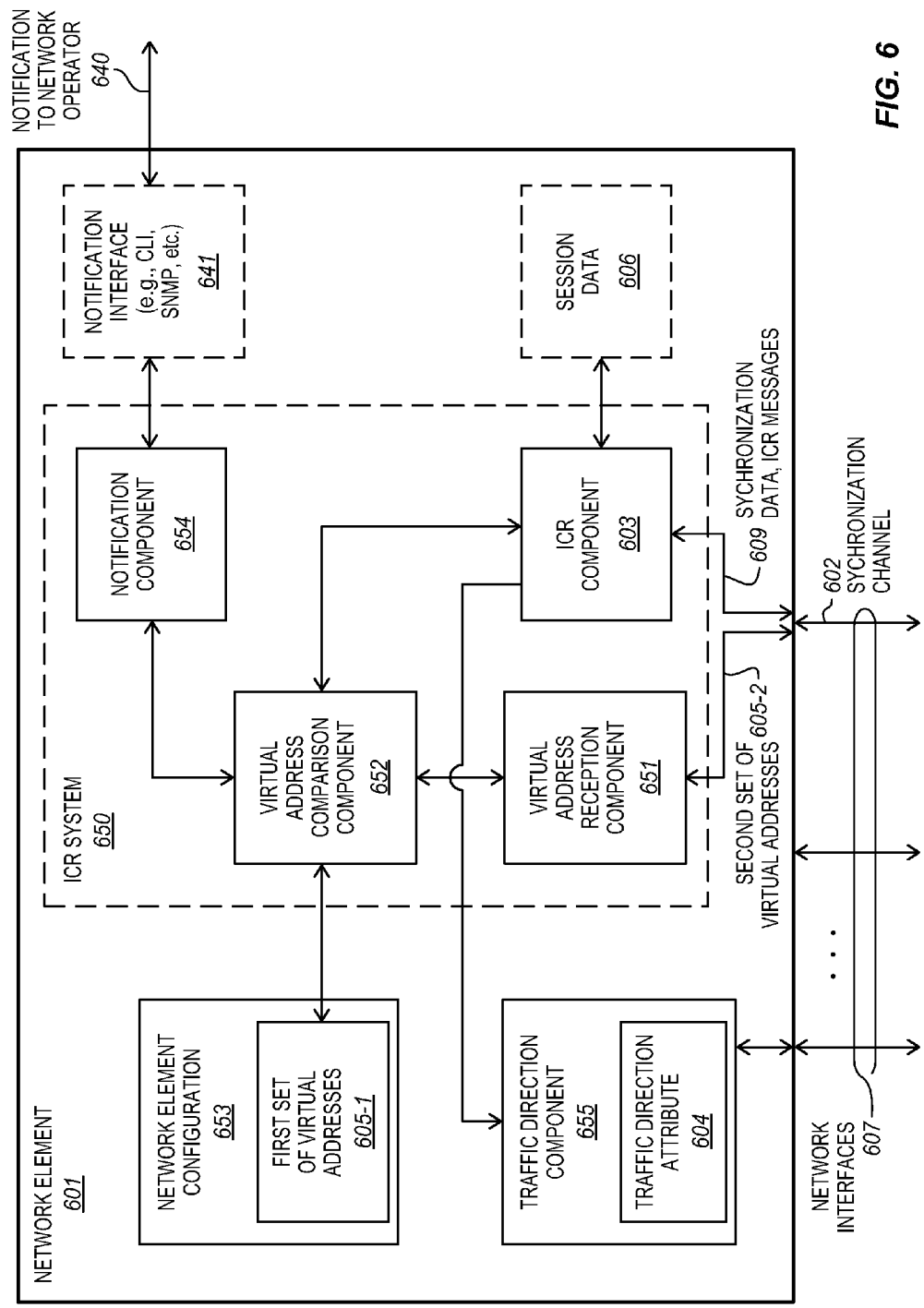
FIG. 6 is a block diagram of an example embodiment of a network element that is operable to cause a notification of a network operator when mismatching sets of virtual addresses are configured on the network element and a second network element, prior to making one of the sets of virtual addresses available for network traffic reception.

FIG. 6 is a block diagram of an example embodiment of a network element 601 that is operable to cause a notification 640 of a network operator when mismatching sets of virtual addresses 605-1, 605-2 are configured on the network element 601 and a second network element (not shown), prior to making one of the sets of virtual addresses 605-1, 605-2 available for network traffic reception. The network element is coupled with the second network element by a synchronization channel 602. The network element is configured for ICR and to exchange synchronization data with the second network element over the synchronization channel. The network element may be either the active or standby network element. In some embodiments, the network element and the second network element may be located at different geographical locations.

In some embodiments, the network element 601 of FIG. 6 may perform operations and/or methods that are similar to or the same as those of FIGS. 3-4. However, it is to be understood that, in other embodiments, the network element 601 can perform operations and/or methods different than those of FIGS. 3-4. Moreover, the operations and/or methods of FIGS. 3-4 can be performed by network elements different than the network element 601 of FIG. 6.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are often provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element can store one or more bridging tables that are used to forward data based on the layer 2 information in this data.

Referring again to FIG. 6, the network element includes a plurality of network interfaces 607. A virtual address reception component 651 of the network element is coupled or in communication with the network interfaces 607. The virtual address reception component is operable to receive, from the second network element, a second set of virtual addresses 605-2, which are configured on the second network element. As shown, in some embodiments, the virtual address reception component may be operable to receive the second set of virtual addresses from the synchronization channel 602. In one aspect, the synchronization channel may represent a dedicated peer-to-peer channel that may be implemented over the same network that is used to handle the network traffic. Examples of suitable transport protocols include, but are not limited to, various different types of TCPs (Transmission Control Protocols), various different types of UDPs (User Datagram Protocols), and combinations thereof.

A virtual address comparison component 652 of the network element is coupled or in communication with the virtual address reception component 651. The virtual address comparison component is operable to compare the second set of virtual addresses 605-2 with a first set of virtual addresses 605-1, which are configured on the first network element. The first set of virtual addresses may be stored or otherwise preserved in a network element configuration 653, such as, for example, a file or data structure stored in a memory. Based on the comparison, the virtual address comparison component is operable to determine whether or not the first and second sets of virtual addresses match.

The network element also includes a notification component 654. The notification component is coupled or in communication with the virtual address comparison component 652. The notification component is operable to cause or result in the notification 640 of a network operator in an event that the comparison indicates that the first and second sets of virtual addresses do not match. The notification may be similar to or the same as the other notifications described elsewhere herein. For example, the notification may include a message, an alarm, an error in an error log, or a combination thereof. In some embodiments, the notification may be provided though a notification interface 641, such as, for example, a CLI, SNMP interface, GUI, other network management interface, or other notification interface.

A traffic direction component 655 of the network element is coupled or in communication with the network interfaces 607. The traffic direction component has a traffic direction attribute 604. The traffic direction component is operable to announce or advertise the first set of virtual addresses 605-1 to an external network with the traffic direction attribute. In various aspects, the traffic direction component and traffic direction attribute may be a BGP module and a BGP metric, an OSPF module and an OSPF metric, or an L2 traffic direction component (e.g., a Virtual Router Redundancy Protocol (VRRP) component) and an L2 traffic direction attribute (e.g., a virtual MAC).

The network element also includes an interchassis redundancy (ICR) component 603. The ICR component is coupled or in communication with the virtual address comparison component 652, the traffic direction component 655, and the network interfaces 607. The ICR component is operable to cause the traffic direction component to announce or advertise the first set of virtual addresses to the external network with the traffic direction attribute in an event that the comparison indicates that the first and second sets of virtual addresses match. The ICR component may also request that the traffic direction component monitor the first set of virtual addresses to see if the other network element has a better traffic direction attribute. Once the traffic direction component learns about any matching virtual addresses in the second set of virtual addresses it may notify the ICR component. The network element with the better traffic direction attribute will be active and the other network element will be standby. In some embodiments, the ICR component may be operable to refrain from announcing or advertising the first set of virtual addresses to the external network when the first and second sets of virtual addresses do not match in order to defer network traffic reception until after the first and second sets of virtual addresses match. Since the virtual addresses match prior to the virtual addresses being announced or advertised to the network, the aforementioned active-active state and/or ICR role flip-flopping may be avoided.

The ICR component may be operable to cause synchronization data and ICR messages (e.g., ICR status messages, ICR control messages, etc.) 609 to be exchanged between the first and second network elements over the synchronization channel. The ICR component is coupled with session data 606. The ICR component may also be operable to detect a switchover event (e.g., a failure of the active network element). For example, if the active network element fails, the traffic direction component on the standby network element may detect the disappearance of the virtual addresses and notify the ICR component. The ICR component may then implement the switchover.

The ICR component 603, the virtual address reception component 651, the virtual address comparison component 652, and the notification component 654, constitute an ICR system 650. In one embodiment, one or more of these components may be implemented as software running on a control plane. For example, the software may run on one or more controller cards (e.g., an XCRP (Cross-Connect Route Processor) card, an ASE (Advanced Service Engine) card, a Route Processor card, etc.). As another option, some portion of one or more of these components may be implemented in firmware, or hardware (e.g., circuitry), on a control card or other card, or a combination of software, firmware, and hardware may be used.

While embodiments of the invention have been described in relation to active and standby network elements, other embodiments may involve network elements that are each active for a different portion of the network traffic and backup or standby for the portion of the network traffic that is active on the other network element. For example, two network elements may each be active for part (e.g., 50%) of the network traffic or sessions anchored to that network element. Each network element may handle signaling and data traffic for the network traffic or sessions it anchors, and may provide redundancy (e.g., synchronized session data) for the sessions that are anchored to the other network element. Each network element may have a first set of virtual addresses for the anchored network traffic, and a second set of virtual addresses that match those virtual addresses used to anchor network traffic at the other network element. The combined sets of virtual addresses on each network element should match, as previously described. Moreover, while embodiments of the invention have been described in relation to two network elements participating in a redundancy mechanism, other embodiments may include three or more network elements participating in a redundancy mechanism. Therefore, embodiments of the invention are not limited to purely active and standby network element redundancy schemes.

Figure 7:
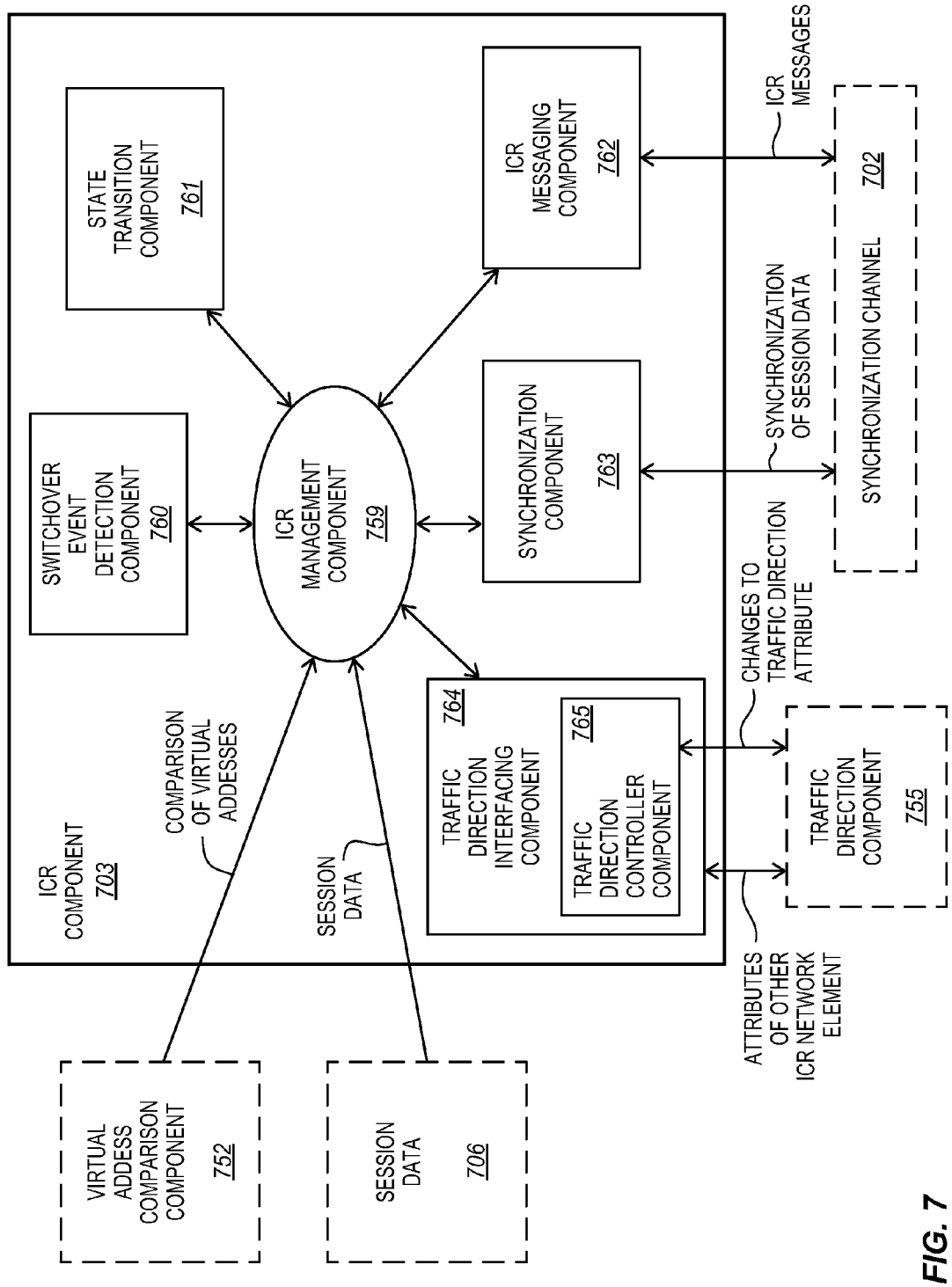
FIG. 7 is a block diagram of an example embodiment of an ICR component.

FIG. 7 is a block diagram of an example embodiment of an ICR component 703. The ICR component includes an ICR management component 759, a switchover event detection component 760, a state transition component 761, an ICR messaging component 762, a synchronization component 763, and a traffic direction interfacing component 764. The ICR management component is coupled or in communication with, and operable to manage these other constituent components, in order to achieve ICR.

The ICR messaging component 762 is operable to exchange ICR messages (e.g., ICR status messages and ICR control messages) with a synchronization channel 702. The switchover event detection component 760 is operable to detect switchover events. In one aspect, the switchover detection component may utilize the ICR status messages to detect the switchover events. The ICR management component may receive a comparison of virtual addresses from a virtual address comparison component 752. The state transition component 761 is operable to cause ICR role or state transitions (e.g., from init to active or standby, or from standby to active as a result of a detected switchover event). In some embodiments, the state transition component may refrain from transitioning from an init state to either an active or standby state if the comparison of the virtual addresses indicates that they do not match.

The traffic direction interfacing component 764 is operable to interface with a traffic direction component 755 (e.g., to receive the traffic direction attributes of the other ICR network element). A traffic direction controller component 765 is operable to request or cause changes in the traffic direction attribute of the traffic direction component. In one aspect, the traffic direction attributes may be changed upon detection of a switchover event. The ICR management component may also receive session data 706. The synchronization component 763 is operable to exchange synchronization data (e.g., a stateful synchronization of the session data) with the synchronization channel 702.

Figure 8:
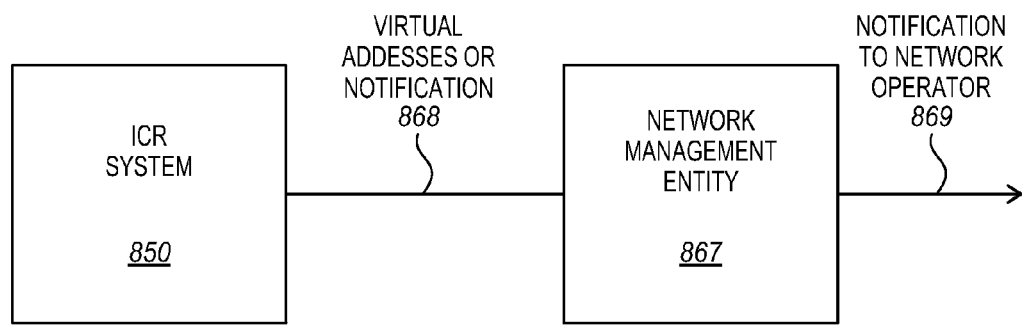
FIG. 8 is a block diagram of an example embodiment of an ICR system coupled or in communication with a network management entity that is operable to provide a notification to a network operator when sets of virtual addresses configured on network elements of an ICR system do not match.

FIG. 8 is a block diagram of an example embodiment of an ICR system 850 coupled or in communication with a network management entity 867 that is operable to provide a notification 869 to a network operator when sets of virtual addresses configured on network elements of an ICR system do not match. The ICR system may be part of a first network element configured with a first set of virtual addresses, and may receive a second set of virtual addresses that are configured on a second network element. In some embodiments, the ICR system may provide the first and second sets of virtual addresses 868 to the network management entity, the network management entity may compare the first and second sets of virtual addresses to determine whether or not they match, and the network management entity may provide the notification to the network operator when they do not match. In other embodiments, the ICR system may compare the first and second sets of virtual addresses, the ICR system may provide a notification 868 to the network management entity, and the network management entity may provide the notification to the network operator when the notification from the ICR system indicates that the sets of virtual addresses do not match.

The methods and network elements disclosed herein may be used in a wide variety of different types of networks and at different locations within those networks. In some embodiments, the methods and network elements may be used in cellular networks, although the scope of the invention is not so limited.

Figure 9:
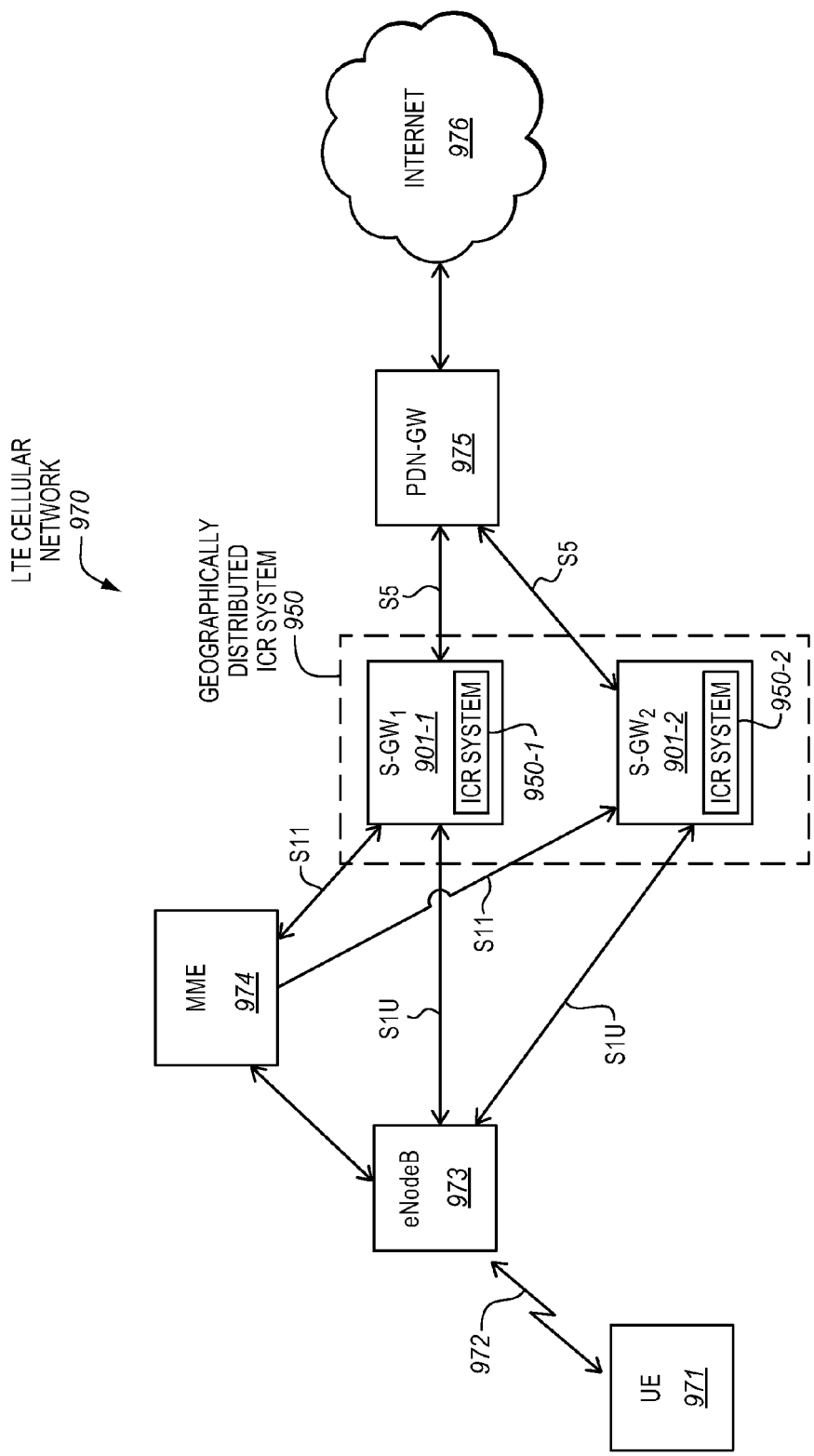
FIG. 9 is a block diagram of an example embodiment of a 3rd Generation Partnership Project (3GPP) Long Term Evolution (LTE) architecture cellular network 970 suitable for implementing embodiments of the invention.

FIG. 9 is a block diagram of an example embodiment of a 3rd Generation Partnership Project (3GPP) Long Term Evolution (LTE) architecture cellular network 970 suitable for implementing embodiments of the invention. User devices or equipment 971 (e.g., cell phones, laptops, and other wireless devices) establish wireless connections 972 with the network through an eNodeB 973. The eNodeB represents the LTE network base station. Although one eNodeB is shown, there often may be other base stations. The user data (e.g., IP packets) from/to the user equipment may be handled by two different types of LTE network entities, referred to as a Serving Gateway (S-GW) 901 and a Packet Data Network Gateway (PDN-GW) 975. The S-GW and the PDN-GW are subcomponents of System Architecture Evolution (SAE) which represents the core network architecture of LTE. The main component or core of SAE is known as the SAE core or Evolved Packet Core (EPC). The S-GW and PDN-GW are logically separated entities according to LTE, although they may be physically deployed on either one or more physical network elements/chassis.

A first S-GW 901-1 and a second S-GW 901-2 are shown. Each of the S-GWs is coupled or in communication with the eNodeB by a respective user plane interface (S1U). These interfaces may handle the per-bearer user plane tunneling and inter eNodeB path switching during handover. In one aspect, the transport protocol over these interfaces is GPRS Tunneling Protocol-User plane (GTP-U). The S-GWs may receive user date over the S1U interfaces, and also buffer downlink IP packets destined for user equipment that happen to be in idle mode. Each of the S-GWs is coupled or in communication with the PDN-GW by a respective S5 interface. The S5 interfaces may provide user plane tunneling and tunnel management between the S-GWs and the PDN-GW, may be used for S-GW relocation due to UE 971 mobility. Each of the S-GWs is coupled or in communication with a Mobility Management Entity (MME) 974 by a respective S11 interface. The PDN-GW 975 may serve as a gateway towards external IP networks (e.g., the Internet) 976. The PDN-GW may also include logic for IP address allocation, charging, packet filtering, policy-based control of flows, etc. The network may include other network elements, such as one or more routers between the eNodeB and the S-GW, between the S-GW and the PDN-GW, and/or between the PDN-GW and the Internet.

In the illustrated example embodiment, the first and second S-GWs form a geographically distributed ICR system 950 and are configured to participate in ICR, although the scope of the invention is not so limited. The first and second S-GWs may be at different geographical locations to provide geographically distributed redundancy. The first S-GW has a first example embodiment of an ICR system 950-1 and the second S-GW has a second example embodiment of an ICR system 950-2. The ICR systems may be similar to or the same as those described elsewhere herein and/or may perform methods similar to or the same as those described elsewhere herein. For example, the ICR systems may be operable to determine whether sets of virtual addresses configured on their respective S-GWs match and notify a network operator when the sets of virtual addresses configured on their respective S-GWs do not match. In some embodiments, the virtual addresses may be used to access the S1U, S5, and S11 interfaces.

This particular example embodiment has illustrated a pair of S-GWs using ICR, each having an embodiment of an ICR system as disclosed elsewhere herein, and each performing an embodiment of a method as disclosed elsewhere herein. In another embodiment, a pair of PDN-GWs may use ICR, may each have an embodiment of an ICR system as disclosed elsewhere herein, and may each perform an embodiment of a method as disclosed elsewhere herein. In still other embodiments, two or more other types of network elements of a cellular or other network, may form a geographically distributed redundancy system, have embodiments of ICR systems as disclosed elsewhere herein, and perform embodiments of methods as disclosed elsewhere herein. Embodiments are applicable to various different types of Layer 2 or Layer 3 network elements in various different types of networks where providing ICR is desired.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the methods, it should be understood that such order is exemplary. Alternative embodiments may potentially perform the operations in a different order, combine certain operations, overlap certain operations, etc. In addition, one or more operations may optionally be removed from the methods or one or more operations may optionally be added to the methods.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

What is claimed is:

1. A method in a first network element, the first network element coupled with a second network element by a synchronization channel, the network elements configured to exchange synchronization data over the synchronization channel, of notifying a network operator when mismatching sets of virtual addresses are configured on the first and second network elements, said method comprising the steps of:
   receiving, from the second network element, a second set of virtual addresses, which are configured on the second network element;
   determining that the second set of virtual addresses and a first set of virtual addresses, which are configured on the first network element, do not match, prior to making the first and second sets of virtual addresses available for network traffic processing; and
   notifying a network operator responsive to determining that the first and second sets of virtual addresses do not match.

2. The method of claim 1, wherein the step of notifying the network operator comprises notifying the network operator specifically that the first and second sets of virtual addresses do not match.

3. The method of claim 2, wherein the step of notifying the network operator specifically that the first and second sets of virtual addresses do not match comprises specifically indicating a virtual address that is configured on only one of the first and second network elements.

4. The method of claim 1, wherein the step of notifying the network operator comprises at least one of sending a message, providing an alarm, and adding an error to an error log.

5. The method of claim 1, wherein the step of receiving the second set of virtual addresses comprises receiving the second set of virtual addresses from the synchronization channel before announcing the first set of virtual addresses to a network.

6. The method of claim 1, further comprising a step of preventing the first and second sets of virtual addresses from being available for the network traffic reception as long as the first and second sets of virtual addresses do not match.

7. The method of claim 1, wherein the step of determining further comprises comparing an attribute pertaining to a first virtual address of the first set of virtual addresses with an attribute pertaining to a second corresponding virtual address of the second set of virtual addresses.

8. The method of claim 7, wherein the attribute pertaining to the first virtual address comprises one of route map information and access control list information.

9. The method of claim 1, further comprising the steps of:
   receiving, from the network operator, a revision to the first set of virtual addresses;
   receiving, from the second network element, a potentially updated second set of virtual addresses;
   determining that the potentially updated second set of virtual addresses and the revised first set of virtual addresses match; and
   making the first and second sets of virtual addresses available for network traffic reception responsive to determining that the revised first set of virtual addresses and the second set of virtual addresses match.

10. The method of claim 1, wherein the step of receiving the second set of virtual addresses comprises receiving at least one of: (a) a virtual address corresponding to an S11 interface with a mobility management entity; (b) a virtual address corresponding to an S5 interface with a packet data network gateway; and (c) a virtual address corresponding to an S1 interface with a base station.

11. The method, of claim 1, wherein the step of receiving, from the second network element, the second set of virtual addresses, comprises receiving the second set of virtual addresses at the first network element which is at a first geographical location from the second network element which is at a second, different geographical location.

12. A first network element, the first network element operable to be coupled with a second network element by a synchronization channel, the first network element configured to exchange synchronization data with the second network element over the synchronization channel, the first network element operable to notify a network operator when mismatching sets of virtual addresses are configured on the first and second network elements, said first network element comprising:
   a plurality of network interfaces;
   a virtual address reception component, coupled with the network interfaces, and operable to receive, from the second network element, a second set of virtual addresses, which are configured on the second network element;
   a virtual address comparison component, coupled with the virtual address reception component, the virtual address comparison component operable to compare the second set of virtual addresses with a first set of virtual addresses, which are configured on the first network element, prior to making the first and second sets of virtual addresses available for network traffic processing;
   a notification component, coupled with the virtual address comparison component, the notification component operable to cause a notification of a network operator in an event that the comparison indicates that the first and second sets of virtual addresses do not match;

a traffic direction component coupled with the network interfaces, the traffic direction component having a traffic direction attribute and operable to announce the first set of virtual addresses with the traffic direction attribute; and an interchassis redundancy component, coupled with the virtual address comparison component, the traffic direction component, and the network interfaces, the interchassis redundancy component operable to cause the traffic direction component to wait to announce the first set of virtual addresses with the traffic direction attribute for network traffic processing until the comparison indicates that the first and second sets of virtual addresses match.

13. The first network element of claim 12, wherein the notification component is operable to cause a notification of the network operator that specifically indicates that the first and second sets of virtual addresses do not match, prior to the first set of virtual addresses being announced with the traffic direction attribute.

14. The first network element of claim 13, wherein the notification component is operable to cause a notification of the network operator that specifically indicates a virtual address configured on only one of the first and second network elements.

15. The first network element of claim 12, wherein the notification component is operable to cause a notification by at least one of sending a message, providing an alarm, and adding an error to an error log.

16. The first network element of claim 12, wherein the virtual address reception component is operable to receive second set of virtual addresses from the synchronization channel before the second set of virtual addresses have been advertised with a traffic direction attribute.

17. The first network element of claim 12, wherein the interchassis redundancy component is operable to prevent the first set of virtual addresses from being available for the network traffic reception as long as the first and second sets of virtual addresses do not match.

18. The first network element of claim 12, wherein the virtual address comparison component is operable to compare an attribute pertaining to a first virtual address of the first set of virtual addresses with an attribute pertaining to a corresponding second virtual address of the second set of virtual addresses.

19. The first network element of claim 18, wherein the attribute pertaining to the first virtual address comprises route map information.

20. The first network element of claim 18, wherein the attribute pertaining to the first virtual address comprises access control list information.

21. The first network element of claim 12, wherein the first network element comprises one of a serving gateway (S-GW) and a packet data network gateway (PDN-GW) of a mobile backhaul.

22. The first network element of claim 12, wherein the first and second network elements are operable to be deployed at different geographical locations.

23. A first network element, the first network element operable to be coupled with a second network element by a synchronization channel, the first network element configured to exchange synchronization data with the second network element over the synchronization channel, the first network element operable to notify a network operator when mismatching sets of virtual addresses are configured on the first and second network elements, said first network element comprising:

a plurality of network interfaces;

a virtual address reception component, coupled with the network interfaces, and operable to receive, from the second network element, a second set of virtual addresses, which are configured on the second network element;

a virtual address comparison component, coupled with the virtual address reception component, the virtual address comparison component operable to compare the second set of virtual addresses with a first set of virtual addresses, which are configured on the first network element, prior to making the first and second sets of virtual addresses available for network traffic processing, wherein the virtual address comparison component is also operable to compare an attribute pertaining to a first virtual address of the first set of virtual addresses with an attribute pertaining to a corresponding second virtual address of the second set of virtual addresses;

a notification component, coupled with the virtual address comparison component, the notification component operable to cause a notification of a network operator in an event that the comparison indicates that the first and second sets of virtual addresses do not match;

a traffic direction component coupled with the network interfaces, the traffic direction component having a traffic direction attribute and operable to announce the first set of virtual addresses with the traffic direction attribute; and an interchassis redundancy component, coupled with the virtual address comparison component, the traffic direction component, and the network interfaces, the interchassis redundancy component operable to cause the traffic direction component to announce the first set of virtual addresses with the traffic direction attribute for network traffic processing after determining that the first and second sets of virtual addresses match and the attribute pertaining to the first virtual address matches the attribute pertaining to the second virtual address.

24. The network element of claim 23, wherein the attribute pertaining to the first virtual address is selected from route map information and access control list information, and wherein the interchassis redundancy component is to prevent the first set of virtual addresses from being announced with the traffic direction attribute until after the first and second sets of virtual addresses match.

* * * * *

UNITED STATES PATENT AND TRADEMARK OFFICE
CERTIFICATE OF CORRECTION

PATENT NO. : 8,825,844 B2
APPLICATION NO. : 13/221743
DATED : September 2, 2014
INVENTOR(S) : Bajamahal Page 1 of 1

It is certified that error appears in the above-identified patent and that said Letters Patent is hereby corrected as shown below:

In the Claims

In Column 18, Line 37, in Claim 11, delete "method," and insert -- method --, therefor.

In Column 20, Line 51, in Claim 24, delete "network" and insert -- first network --, therefor.

Signed and Sealed this
Twenty-fifth Day of August, 2015

Michelle K. Lee
*Director of the United States Patent and Trademark Office*